United States Patent
Vialen

(10) Patent No.: US 6,978,143 B1
(45) Date of Patent: Dec. 20, 2005

(54) METHOD AND ARRANGEMENT FOR MANAGING PACKET DATA TRANSFER IN A CELLULAR SYSTEM

(75) Inventor: Jukka Vialen, Espoo (FI)

(73) Assignee: Nokia Mobile Phones, LTD, Espoo (FI)

( * ) Notice: Subject to any disclaimer, the term of this patent is extended or adjusted under 35 U.S.C. 154(b) by 575 days.

(21) Appl. No.: 09/507,804

(22) Filed: Feb. 22, 2000

(30) Foreign Application Priority Data

Feb. 23, 1999 (FI) .................................... 990384

(51) Int. Cl.[7] ............................................. H04Q 7/00
(52) U.S. Cl. .................................. 455/452.2; 370/329
(58) Field of Search ............................... 370/349, 329, 370/333, 352; 455/455, 450, 466, 452.2

(56) References Cited

U.S. PATENT DOCUMENTS

| | | | | |
|---|---|---|---|---|
| 5,673,259 A | * | 9/1997 | Quick, Jr. .................... | 370/342 |
| 6,078,568 A | * | 6/2000 | Wright et al. ................ | 370/312 |
| 6,111,867 A | * | 8/2000 | Mann et al. ................. | 370/337 |
| 6,347,091 B1 | * | 2/2002 | Wallentin et al. ........... | 370/437 |

FOREIGN PATENT DOCUMENTS

WO     WO 96/37079     11/1996

OTHER PUBLICATIONS

UMTS YY.01 UE-UTRAN Radio Interface Protocol Architecture, Stage 2, Dec. 18, 1998, ETSI.
UMTS (YY.02) Layer 1, General Requirements, Dec. 1998.

* cited by examiner

Primary Examiner—Nick Corsaro
(74) Attorney, Agent, or Firm—Perman & Green, LLP

(57) ABSTRACT

A method and an arrangement for managing packet data transfer in a cellular system such as the Universal Mobile Telecommunications System, UMTS. The decision about the channel used for the transfer of packet data is made based on a channel selection parameter and values of the parameters needed in the decision-making are sent to the mobile station. The parameters are advantageously sent on a common channel such as the BCH or FACH. Parameters sent advantageously include the maximum packet size on the RACH, current RACH load, a threshold value for amount of data in RLC buffers, etc. The parameters may concern all mobile stations, a subset of the mobile stations or one mobile station in the area in which the parameters are sent. The invention minimizes the transfer capacity load associated with signaling and the transfer of packet data can be performed with minimal delays caused by signaling.

21 Claims, 4 Drawing Sheets

METHOD AND ARRANGEMENT FOR MANAGING PACKET DATA TRANSFER IN A CELLULAR SYSTEM

CROSS-REFERENCES TO RELATED APPLICATIONS

BACKGROUND OF THE INVENTION

1. Field of the Invention

The invention relates to a method and an arrangement for managing the transfer of packet data in a cellular system. The invention is advantageously applied in WCDMA (Wideband Code Division Multiple Access) based mobile communications systems, such as UMTS (Universal Mobile Telecommunications System), which uses TDD (Time Division Duplex) and FDD (Frequency Division Duplex) modes.

2. Description of the Related Art Including Information Disclosed Under 37 CFR 1.97 and 1.98

To aid in understanding the invention, it is below described in more detail the structure of the UMTS system, which is a so-called third-generation telecommunications system, and the transfer of packet data in the UMTS. It should be noted, however, that the channels, protocol layers and signaling procedures presented here are just examples associated with the UMTS system and the application of the present invention is in no way limited to them. Methods according to the prior art are also described in the patent application document WO 96/37079 and in the proposal for a standard ETSI, European Telecommunications Standards Institute; UMTS YY.01 UE-UTRAN Radio Interface Protocol Architecture; Stage 2, 18.12.1998, and UMTS (YY.02) Layer 1; General Requirements, 12/1998.

Figure 1:
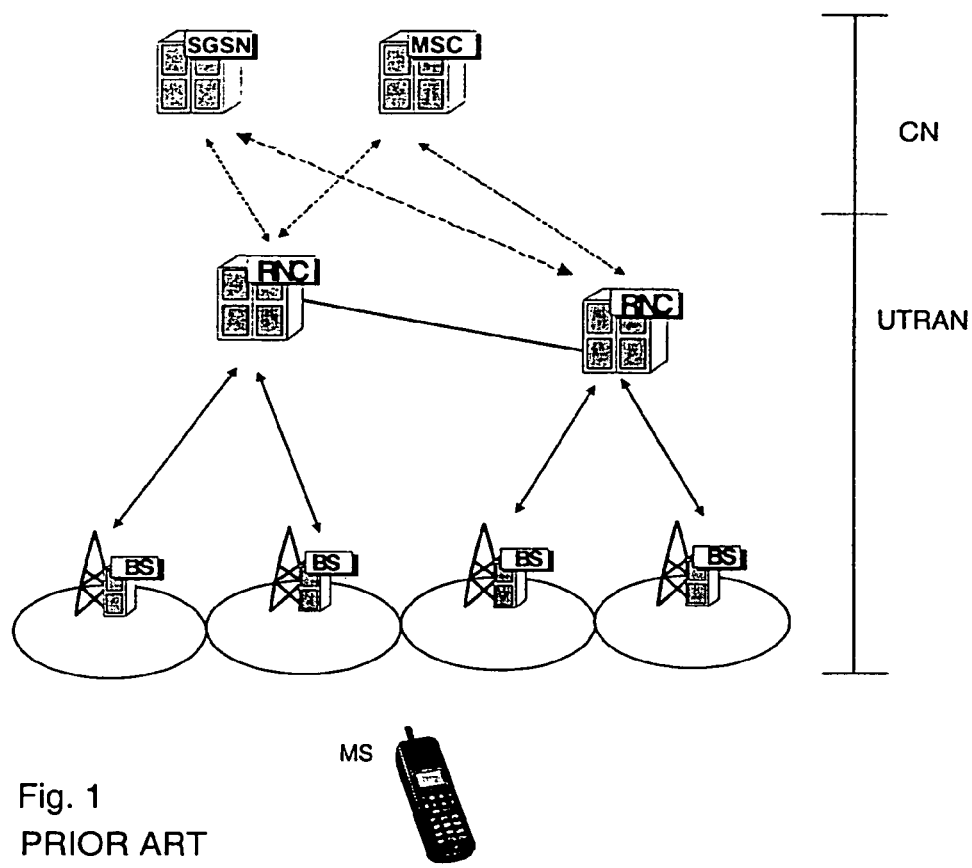

FIG. 1 schematically shows a third-generation digital cellular system. The entity comprised of base station subsystems (BSS), including radio network controllers (RNC) and base stations (BS), is called a UTRAN (UMTS Terrestrial Radio Access Network). Core networks CN comprise different exchange systems, such as MSC (Mobile Services Switching Center) and SGSN (Serving GPRS Support Node; GPRS=General Packet Radio Service), which in addition to versatile communications facilities may also offer various intelligent network services. A mobile station MS can be connected with a plurality of core networks CN via UTRAN.

Figure 2:
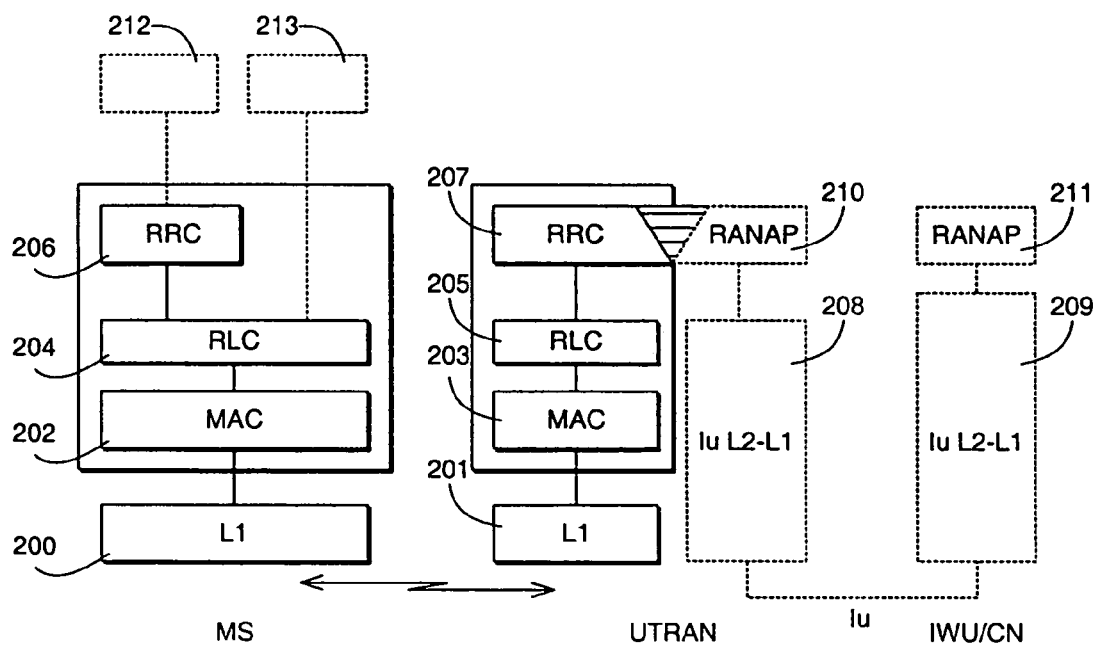

FIG. 2 shows protocol layers in a proposed UMTS system. The lowest protocol layer between the mobile station MS and radio access network UTRAN is Layer 1 (L1) 200, 201, which corresponds to the physical radio link. Above that layer there is an entity corresponding to layer 2 of the conventional OSI model, with a media access control (MAC) layer 202, 203 at the bottom and above it a radio link control (RLC) layer 204, 205. On the top there is a radio resource control (RRC) layer 206, 207 of layer 3 of the OSI model. In between the radio access network UTRAN and the interworking unit of the core network IWU/CN there is a so-called Iu interface where OSI model layers L1 and L2 (blocks 208 and 209 in FIG. 2) correspond to the above-described layers from L1 to RLC, and OSI model layer L3 (RANAP; blocks 210 and 211 in FIG. 2) corresponds to the above-described RRC layer. The IWU is needed if the UTRAN is connected to a second-generation core network, but if there is a third-generation MSC or SGSN the IWU is not needed but the Iu interface suffices.

In the radio interface of the UMTS system, user data and signaling may be sent either on a dedicated channel (DCH) allocated to the mobile station (for a given service offered to the mobile station) or on a common channel. Common channels include e.g. the random access channel RACH, forward link access channel FACH, broadcast channel BCH and the paging channel PCH.

The RACH is used only in the uplink direction. As the RACH is not reserved there is a risk that multiple mobile stations will be using it simultaneously so that a collision occurs on the radio path and the data sent cannot be received. When using the RACH, the identifier of the mobile station originating the transfer has to be sent as well.

Burst transmission power on the RACH is determined using open loop power control. Prior to the transmission of a random access burst the mobile station measures the received power on the downlink primary common control physical channel (CCPCH). In addition, the system informs the mobile station, on the BCH channel, about the transmission power of the CCPCH channel in question. In addition to these data, the transmission power determination uses the uplink interference level information as well as information about the required signal-to-interference ratio (SIR), which are sent to the mobile station on the BCH.

When transferring user data or signaling over the FACH, the identifier of the target mobile station has to be sent as well. Slow, but not fast, transmission power control may be used on the FACH. The transfer rate may be changed on a short notice on the FACH.

A downlink BCH uses a fixed transfer rate. On the BCH, a transmission always covers the whole cell. Likewise, on a downlink PCH a transmission always covers the whole cell.

A dedicated channel DCH may be reserved in the downlink and/or uplink direction. Fast transfer rate changes are possible on the DCH. Also associated with the DCH is fast transmission power control.

Moreover, it is possible that the channel allocated to the mobile station be available to other mobile stations as well, being then a so-called shared channel. Below, a dedicated channel may also refer to such a channel.

The MAC adapts the logical channels and the transfer channels mentioned above in such a manner that the broadcast control channel (BCCH) is transferred on the BCH, the paging control channel (PCCH) is transferred on the PCH, and the dedicated control channel (DCCH) and dedicated traffic channel (DTCH) are transferred on the DCH. In addition, the DCCH and DTCH may also use the FACH/RACH as well as a downlink shared channel (DSCH).

Downlink packet data transfer may be performed in three different ways:

Packet data are transferred on the FACH which the mobile station is currently listening to.

Packet data are transferred on another FACH than the one that the mobile station is listening to, so that the UTRAN first assigns the mobile station a new FACH for the transfer.

Packet data are transferred on a DCH.

Assignment of a DCH channel is signaled on the current FACH. The UTRAN then uses the downlink DCH to transfer the data packets and control information. The DCH may also be assigned using a special signaling DCH (so-called Control Only mode). The mobile station uses the uplink DCH to transfer acknowledgments and control information.

For downlink data the decision to use a common or a dedicated channel may be network implementation dependent, in which case no radio interface signaling is needed.

Uplink packet transfer may be performed in one of two alternative ways:

Data are transferred on the RACH and acknowledgments on the FACH, or

The RACH/FACH is used to assign a DCH for data transfer. The DCH may also be assigned using a special signaling DCH.

Figure 3:
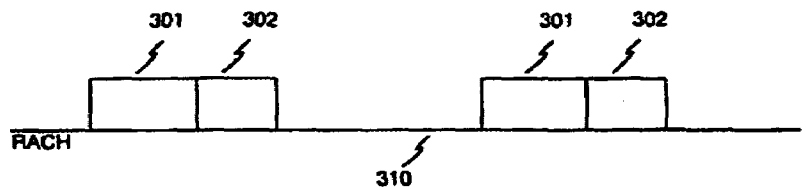

FIG. 3 illustrates packet data transfer on an uplink common channel. A random access burst 301 sent on the RACH is accompanied by a user data packet 302. Such user data packets may be sent on arbitrary moments. The data packets can be acknowledged on the downlink FACH (not shown in FIG. 3).

A DCH is allocated to the mobile station either for a given period of time or indefinitely, in which case the network, upon noticing that the mobile station has stopped transmitting, orders it to release the channel.

Figure 4:
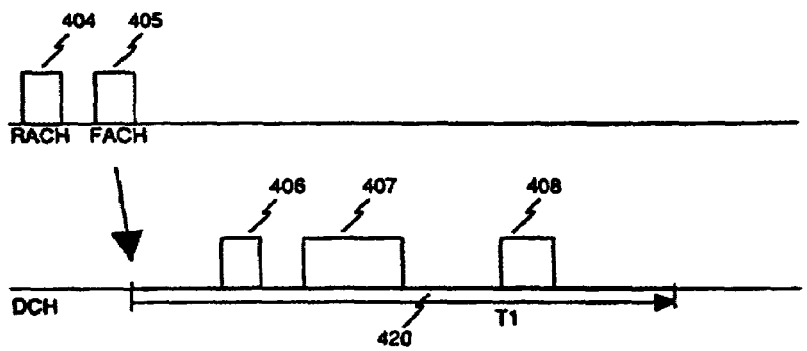

FIG. 4 illustrates data packet transfer on an uplink dedicated channel DCH allocated to the mobile station for a certain period of time T1. A DCH request is made using a random access burst 404 sent on the RACH. The random access burst may also include information about the size of the data packet to be sent or the transfer rate required by the mobile station. If the transfer rate is included as a parameter, the mobile station may select it from among transfer rates allowed for the radio bearer in question. The DCH is allocated using a burst 405 sent on the FACH. The data packets 406–408 are then sent on the DCH 420 according to the allocation made by the system. As the time period $T_1$ reserved for the mobile station comes to an end, the channel is released unless the mobile station requests for additional capacity prior to the end of the time period. This request for additional capacity may be made using a message sent on the DCH.

Figure 5:
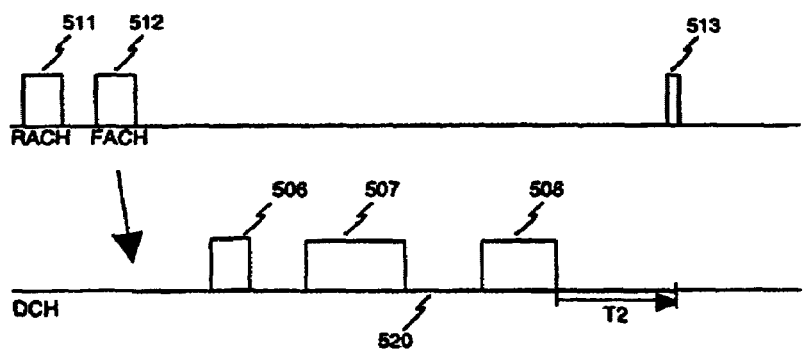

FIG. 5 illustrates data transfer on a dedicated channel DCH allocated for an indefinite period of time. Allocation of the DCH 520 is requested using a burst 511 sent on the RACH, acknowledged 512 by the system by allocating the DCH. The mobile station may then send data packets 506–508 on the DCH allocated to it. Upon detecting a pause T2 of sufficient duration following a transmitted data packet the system sends to the mobile station a channel release command 513 in order to free the channel.

The problem with the uplink packet data transfer is that the system has no information about the packets to be sent on which to base its channel selection decision. Thus the information about the data packets to be transferred would have to be sent to the system, whereafter the system would have to send the information about the decision on the use of a common vs. dedicated channel to the mobile station. This information transfer uses up traffic capacity and slows down the transfer of packet data.

An object of the present invention is to provide a solution for the management of uplink packet data, avoiding the aforementioned problem relating to the prior art.

An idea of the invention is that the decision about the channel to be used for the packet data transfer is made dependent on a channel selection parameter, and parameters needed in the decision-making are sent to the mobile station. The parameters are advantageously sent on a common channel such as the BCH, FACH or PCH. The parameters may also be sent on a DCH if one is allocated to the mobile station. Parameters to be sent advantageously include the maximum packet size allowed for the RACH, current RACH load, etc. The parameters may concern all mobile stations, a subset of the mobile stations or one mobile station in the area in which the parameters are sent. The invention decreases the signaling load associated with the allocation of packet data transfer capacity as well as minimizes the delay associated with the starting of data transfer.

The decision about whether to use a common or a dedicated channel may be based on a plurality of channel selection parameters such as:

size of data packet; amount of data in RLC buffers or information obtained from higher layers about the amount of data to be transferred, bit rate required, allowable transfer delay, priority or importance of the data to be transferred, channel load, power level required for the transfer on the RACH, and maximum packet size transferable on the RACH.

The mobile station usually has the information on the bit rate required, allowable transfer delay and the priority of the data to be transferred for the uplink packet data transfer. The use of these parameters in the channel selection is essential to achieve a sufficient data transfer quality level.

It is important to provide the mobile station with the common channel (RACH) load information in order to achieve the desired reliability of transfer, transfer rate and transfer delay on the channel selected, and to make it possible to determine the transmission power for the random access burst.

The maximum allowed transmit power level on the RACH is also an essential piece of information to be transferred from the system so that it can be verified that the transmit power available and the reliability of the transfer are sufficient, and so that power consumption at the mobile station can be minimized.

Furthermore, the maximum packet size allowed on the RACH is also an important piece of information transferred from the system in order to prevent a data transfer failure due to a packet size too large.

BRIEF SUMMARY OF THE INVENTION

The method according to the invention for the uplink transfer of packet data from a mobile station to the system in such a manner that a common channel (RACH) or a dedicated channel (DCH) is selected for the transfer of a data packet, and the data packet is transferred using the selected channel, is characterized in that a channel selection parameter is defined, a current value is determined for the channel selection parameter, said channel selection parameter is sent from the system to the mobile station, and said selection is made on the basis of said value of the channel selection parameter.

In another embodiment of the invention a threshold value of the channel selection parameter is stored at the mobile station, the current value of the channel selection parameter sent to the mobile station is compared to said threshold value of the channel selection parameter, and said selection is made on the basis of said comparison.

In another embodiment of the invention a value corresponding to the channel selection parameter is calculated at the mobile station on the basis of the parameters of the data packet to be transferred, the last current value of the channel selection parameter sent to the mobile station is compared to said calculated value of the channel selection parameter, and said selection is made on the basis of said comparison.

A cellular system according to the invention, comprising
means for sending packet data in the uplink direction from a mobile station to the system using a selected channel,
means for selecting a common channel (RACH) or a dedicated channel (DCH) for the sending of a data packet, is characterized in that the cellular system also comprises
means for defining a channel selection parameter,
means for determining a current value for the channel selection parameter,
means for sending the value of said channel selection parameter from the system to the mobile station in order to make said selection on the basis of the value of the channel selection parameter.

A mobile station according to the invention which is connected with a cellular system and comprises means for sending uplink packet data to the system using a selected channel, wherein the selected channel is either a common channel (RACH) or a dedicated channel (DCH), is characterized in that the mobile station also comprises
means for receiving a channel selection parameter value from the system, and
means for making said selection dependent on said channel selection parameter value.

BRIEF DESCRIPTION OF THE SEVERAL
VIEWS OF THE DRAWING(S)

Preferred embodiments of the invention are described in the dependent claims.

Figure 7:
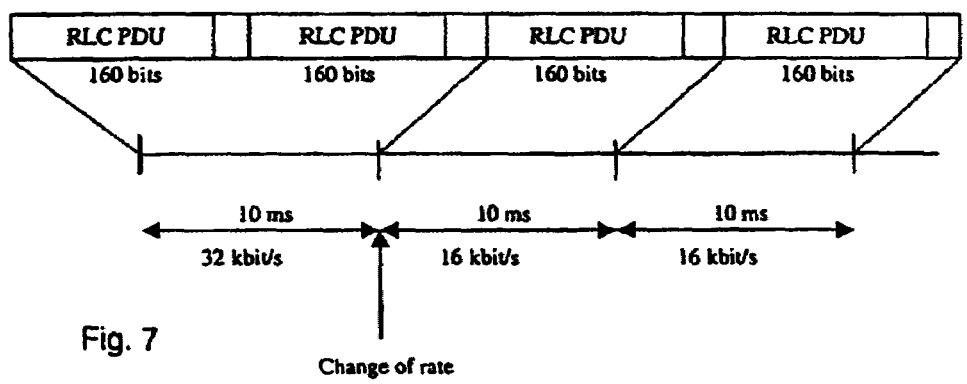
Figure 6:
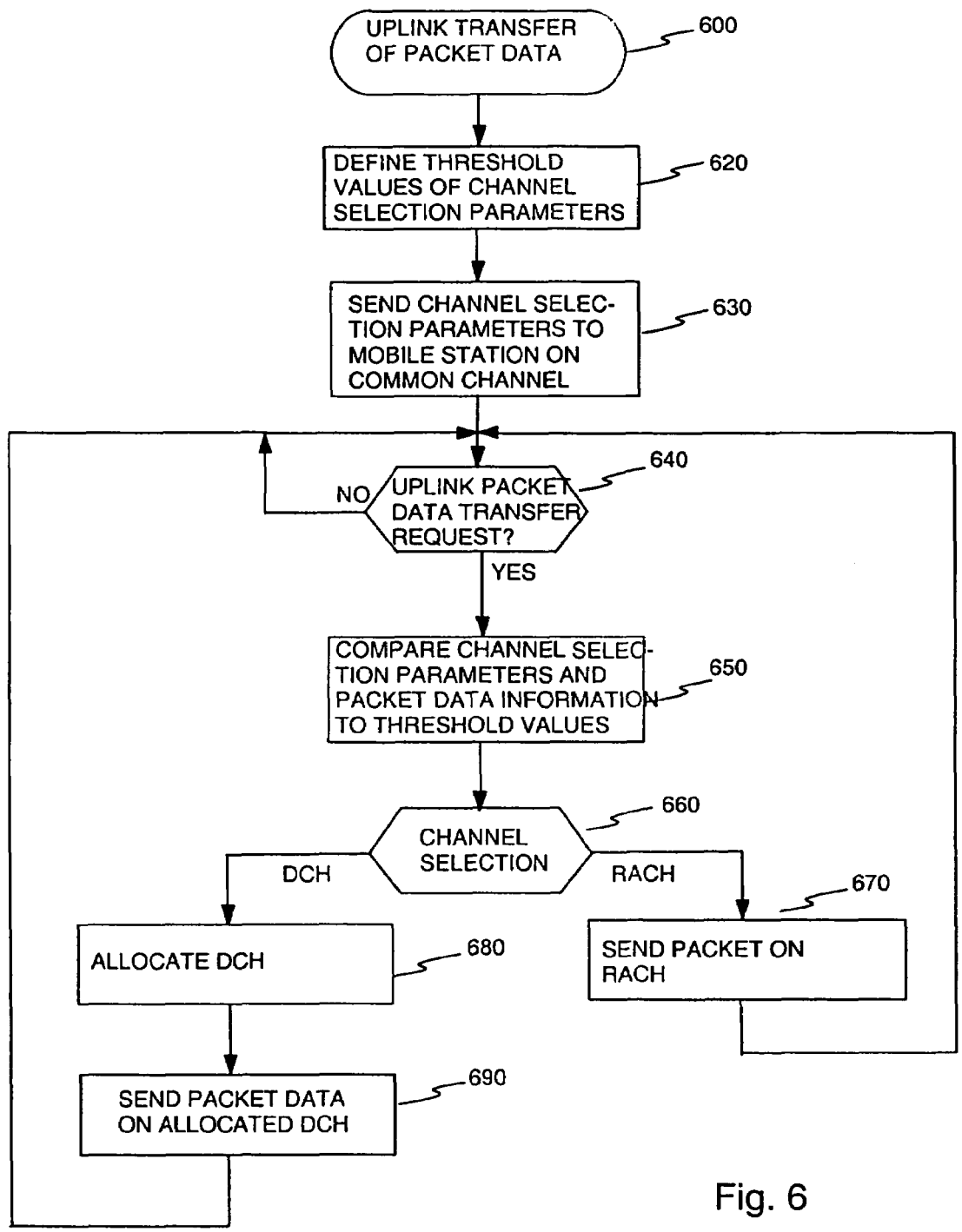
Figure 8:
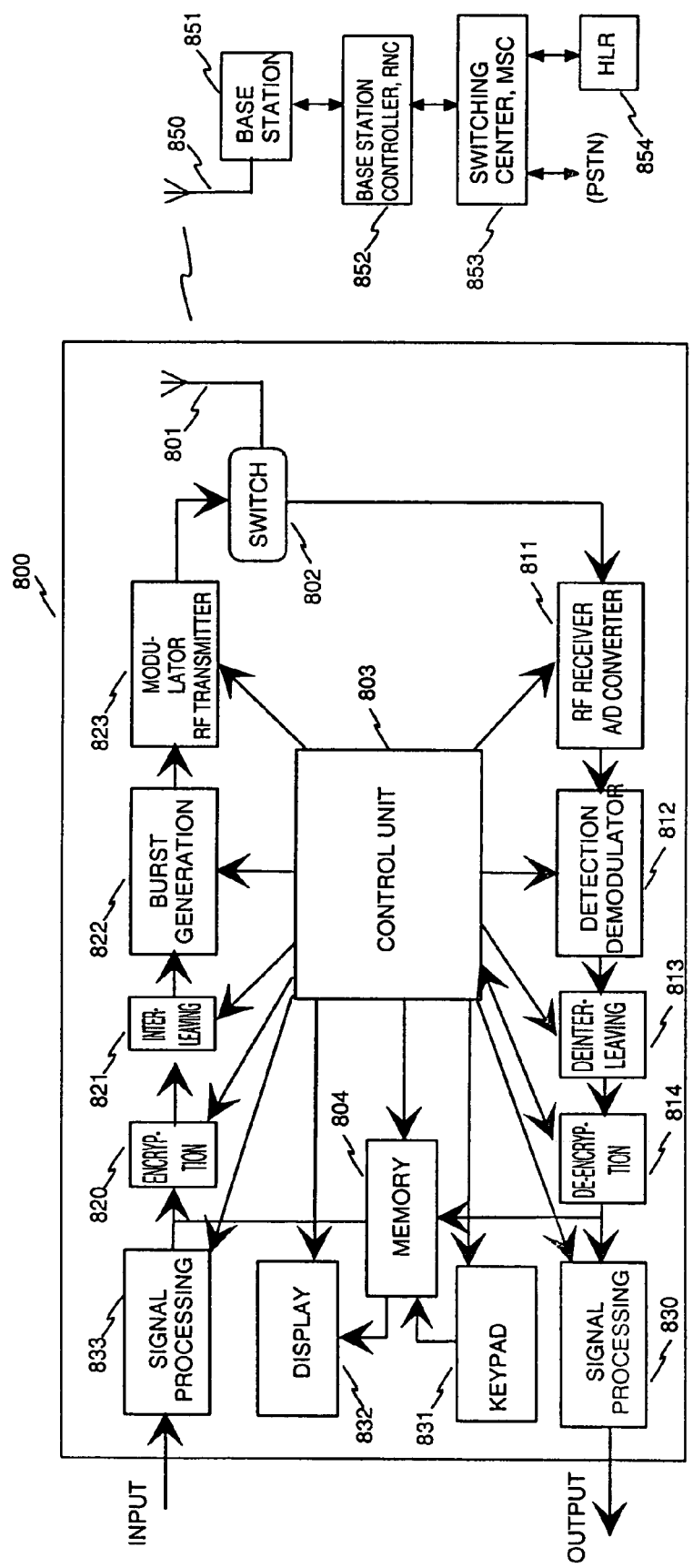

The invention is below described in more detail with reference to the accompanying drawing in which FIG. 1 illustrates the structure of a third-generation cellular radio network, FIG. 2 shows protocol layers in a third-generation radio access network, FIG. 3 illustrates uplink data packet transfer on the RACH, FIG. 4 illustrates the transfer of individual data packets on an uplink DCH, FIG. 5 illustrates the transfer of data comprised of a plurality of data packets on an uplink DCH, FIG. 6 shows a flow chart of a method according to the invention for managing uplink packet data transfer, FIG. 7 illustrates the structure of a protocol data unit, and FIG. 8 shows a block diagram of a mobile station according to the invention.

DETAILED DESCRIPTION OF THE
INVENTION

FIGS. 1 to 5 were already discussed above in conjunction with the description of the prior art, so below the invention is described referring mainly to FIGS. 6 to 8.

FIG. 6 shows a flow chart of a method according to the invention for transferring packet data in the uplink direction, 600. First, threshold values are determined for the channel selection parameters and stored in the mobile station's memory, step 620. It should be noted that a channel selection parameter may have a system-specific invariable threshold value, such as data packet size, while some channel selection parameters may require a current value associated with the threshold value, such as the RACH load, for example. Some threshold values may thus change dynamically.

In step 630 the UTRAN sends on a common channel one or more of said channel selection parameters. This information may be sent on alternative common channels as follows:
on the BCH to mobile stations in the idle mode,
on the FACH to mobile stations in the RACH/FACH mode, or
on the PCH or BCH to mobile stations in the RACH/PCH mode, or, in the packet idle mode. This mode is also known as the URA connected mode.

In the UMTS system the information may be included in the SYSTEM INFORMATION messages, for example.

Moreover, the channel selection parameters may be sent on a DCH e.g. when such a channel is reserved for packet data transfer. Having received a request to send a data packet, step 640, the (RLC/) MAC layer either makes an autonomous decision on the use of a common channel vs. dedicated channel on the basis of parameters received from the system or requests the RRC layer to determine the appropriate channel type.

Described below is an example in which the channel selection parameter is the amount of data to be transferred. When a data packet, or service data unit SDU, arrives during the RACH/FACH mode from the RLC layer to the MAC layer, the MAC compares the size of the SDU to the maximum allowed size. If the size of the RLC packet is greater than the maximum allowed size on the RACH, the MAC layer requests transfer resources in the form of a dedicated channel from the RRC layer. The RRC layer takes care of the packet resource allocation signaling across the radio interface and informs the MAC layer about the traffic channel (DCH) parameters it can use and, if necessary, configures the physical layer (L1). If the size of the RLC packet is smaller than the maximum allowed packet size, the MAC layer schedules the sending of the data on the RACH autonomously.

If the decision is to allocate a DCH, the MAC layer informs the RRC layer which takes care of the capacity request signaling across the radio interface, step 680. The RRC layer of the mobile station uses this parameter together with the bit error rate (BER) value to calculate the maximum allowed RLC-PDU (Protocol Data Unit) size for each particular radio access channel. The BER value is needed to estimate the number of possible retransmissions. If there are multiple radio access channels with different BER parameter values the maximum RLC-PDU may be different for each of them. The maximum allowed RLC-PDU size is sent to the MAC layer of the mobile station.

FIG. 7 shows by way of example a RLC-PDU structure comprising 160 bits when the transfer rate is 16 kbps and 320 bits when the transfer rate is 32 kbps. In addition, the 10-ms Layer 1 frame includes e.g. the L1 CRC (Cyclic Redundancy Check) and possible tail bits.

FIG. 8 shows in a simplified block diagram a mobile station 800 according to the invention and its connection to a cellular system. The mobile station comprises an antenna 801 to receive radio-frequency (RF) signals sent by base stations. A received RF signal is conducted by means of a switch 802 to a RF receiver 811 in which the signal is amplified and converted digital. The signal is then detected and demodulated in block 812 which advantageously comprises a RAKE combiner. Deinterleaving is performed in block 813 and de-encryption in block 814. Signal processing is then performed in block 830. The received data may be stored as such in the mobile station's memory or, alternatively, the processed packet data are transported after the signal processing to a possible external device, such as a computer. A control unit controls the reception blocks mentioned above in accordance with a program stored in the unit.

Transmission according to the invention from a mobile station is performed e.g. as follows. Controlled by the control unit 803, block 833 performs signal processing, and block 820 encrypts the processed signal e.g. on the MAC layer, and block 821 interleaves the signal e.g. on layer L1. Bursts are generated from the encoded data in block 822, which are modulated and amplified into a RF signal in block 823. The RF signal to be transmitted is conducted to the antenna 801 by means of switch 802. The control unit 803 controls also these processing and transmission functions.

The control unit 803 controls the reception blocks in such a manner that the parameters relating to the selection of the uplink channel are received from a common channel in accordance with the invention. Channel selection is advantageously performed in the control unit 803 which also controls the transmission blocks such that the packet data are transmitted on the selected channel.

FIG. 8 also shows a keypad 831 and display 832 that belong to a conventional mobile station. The blocks of the mobile station according to the invention may be implemented using components which are known per se. However, the control unit that controls the other blocks executes the block control functions according to special software, thus realizing the above-described block functions according to the invention.

In addition, FIG. 8 shows the cellular system components used in the transfer of data. Transmission and reception of a RF signal are realized through the antenna 850 of one or more base stations 851. Connection is established from a base station 851 via a base station controller 852 to an exchange 853. The exchange 853 is connected, apart from other base station systems in the system, also to a home location register 854 and public switched telephone network PSTN, among other things. The base station system sends the parameters associated with the selection of the packet data transfer channel to the mobile station in accordance with the invention and receives the packet data sent by the mobile station through a channel selected by the mobile station.

The names of signals, channels, systems and system components as well as the names of other objects used in the examples above are in accordance with the plans for a so-called third-generation mobile communications system, which is discussed here only by way of example, so as to provide an example of a possible application of the invention. The invention is not limited to any particular mobile communications system but it may be modified within the scope of the invention as defined by the claims attached hereto.

What is claimed is:

1. A method for transferring packet data in the uplink direction from a mobile station to a system in such a manner that:
   a common channel (RACH) or a dedicated channel (DCH) is selected for the sending of a data packet, and the data packet is sent using the channel selected, characterized in that
   a threshold value of a channel selection parameter is defined (620),
   said threshold value of the channel selection parameter is sent to the mobile station (630),
   a current value of the channel selection parameter is compared to said threshold value of the channel selection parameter by the mobile station (650), and
   said selection is performed on the basis of said comparison (660).

2. A method according to claim 1, characterized in that said current value corresponding to the channel selection parameter is calculated at the mobile station on the basis of the parameters of the data packet to be transferred.

3. A method according to claim 1, characterized in that if the channel selected for the data packet transfer is a dedicated channel (DCH), a channel (DCH) is allocated after the selection, whereafter the data packet is transferred on the allocated channel (DCH).

4. A method according to claim 1, characterized in that said channel selection parameter value is sent on a common channel.

5. A method according to claim 4, characterized in that the channel selection parameter value is sent on one of the following common channels: BCH, FACH, PCH.

6. A method according to claim 1, characterized in that said channel selection parameter value is sent on a DCH.

7. A method according to claim 1, characterized in that one or more of the following parameters are used in the channel selection:
   size of data packet,
   maximum allowed data packet size on the RACH,
   bit rate required,
   allowed transfer delay,
   priority of data to be transferred,
   load on the transfer channel, and
   transmit power level required on the RACH.

8. A method according to claim 7, characterized in that the size of data packet is determined on the basis of amount of data in RLC buffers.

9. A method according to claim 1, characterized in that the channel selection parameter value sent to the mobile station is one or several of the following:
   maximum allowed data packet size on the RACH,
   load on the transfer channel, and
   maximum allowed power level on the RACH.

10. A method according to claim 8, characterized in that the channel selection parameter value sent to the mobile station is a threshold value for the data in the RLC buffer(s).

11. A method according to claim 1, characterized in that the channel selection parameters are defined so as to concern all mobile stations in the area in which the parameters are sent.

12. A method according to claim 1, characterized in that the channel selection parameters are defined so as to concern a subset of all mobile stations in the area in which the parameters are sent.

13. A method according to claim 1, characterized in that the channel selection parameters are defined so as to concern a single mobile station.

14. The use of the method of claim 1 in a UMTS system.

15. A cellular system comprising:
   means for sending packet data in the uplink direction from a mobile station to the system using a selected channel,
   means for selecting a common channel (RACH) or a dedicated channel (DCH) for the sending of a data packet,
   characterized in that it also comprises:
   means for defining a threshold value of a channel selection parameter,
   means for sending said threshold value of the channel selection parameter from the system to the mobile station in order to compare said threshold value of the channel selection parameter to a current value of the channel selection parameter, and means for making said channel selection on the basis of said comparison.

16. A cellular system of claim 15 characterized in that it is a UMTS system.

17. A mobile station connected with a cellular system, comprising means for sending uplink packet data to the system using a selected channel, wherein the selected channel is either a common channel (RACH) or a dedicated channel (DCH), characterized in that it also comprises:
   means for receiving a threshold value of a channel selection parameter from the system,
   means for storing said threshold value of the channel selection parameter, and
   means for comparing said threshold value of the channel selection parameter to a current value of the channel selection parameter for basis of said channel selection.

18. A mobile station according to claim 17, characterized in that it further comprises:
   means for making said channel selection on the basis of the result of said comparison.

19. A mobile station according to claim 17 characterized in that it comprises:
   means for calculating a value corresponding to the channel selection parameter on the basis of the parameters of the data packet to be sent,
   means for comparing a current value of the last channel selection parameter sent to the mobile station to said calculated value of the channel selection parameter, and
   means for making said channel selection on the basis of said comparison.

20. A mobile station according to claim 19, characterized in that said value corresponding to the channel selection parameter is the amount of data in the RLC buffer(s), said last current value of the last channel selection parameter is a threshold value for the amount of data in the RLC buffer(s).

21. The use of the mobile station of claim 17 in a UMTS system.

* * * * *